US012715594B1

(12) United States Patent
Yazici et al.

(10) Patent No.: US 12,715,594 B1
(45) Date of Patent: Aug. 25, 2026

(54) AIRCRAFT PROPULSION SYSTEM NACELLE WALL WITH INTEGRATED POWER STORAGE

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/210,756

(22) Filed: May 16, 2025

(51) Int. Cl.
*B64D 27/357* (2024.01)
*B64D 27/33* (2024.01)
*F02C 6/00* (2006.01)

(52) U.S. Cl.
CPC .......... *B64D 27/357* (2024.01); *B64D 27/33* (2024.01); *F02C 6/00* (2013.01)

(58) Field of Classification Search
CPC .......... F01D 25/12; F01D 21/00; F01D 21/12; B64D 27/33; B64D 27/357; F02C 7/18; F02C 6/00; F05D 2260/221; F05D 2260/608; F05D 2260/605
See application file for complete search history.

(56) References Cited

U.S. PATENT DOCUMENTS

| | | | | |
|---|---|---|---|---|
| 5,012,639 | A * | 5/1991 | Ream | B64D 29/00 60/39.83 |
| 11,015,509 | B2 * | 5/2021 | Armatorio | H02S 10/30 |
| 11,927,140 | B1 * | 3/2024 | Yazici | F02C 7/24 |
| 12,158,107 | B2 * | 12/2024 | Bifulco | F02C 7/18 |
| 12,234,741 | B2 * | 2/2025 | Kalyanasamy | F01D 19/02 |
| 2021/0324799 | A1 * | 10/2021 | Suzuki | B64D 33/08 |
| 2024/0101261 | A1 | 3/2024 | Buehne | |
| 2024/0158090 | A1 | 5/2024 | Bhatt | |
| 2025/0263174 | A1 * | 8/2025 | Monterzino | B64C 11/48 |

* cited by examiner

*Primary Examiner* — Rodolphe Andre Chabreyrie
(74) *Attorney, Agent, or Firm* — Getz Balich LLC

(57) ABSTRACT

An assembly is provided for an aircraft propulsion system. This assembly includes an engine case, a nacelle wall and a power storage integrated with the nacelle wall. The engine case is configured to house at least one bladed rotor of a turbine engine. The engine case extends axially along and circumferentially about an axis. The nacelle wall extends axially along and circumferentially about the engine case. The nacelle wall is spaced radially outboard from the engine case with a housing compartment radially between the engine case and the nacelle wall. The power storage is radially separated from the engine case by the housing compartment.

13 Claims, 7 Drawing Sheets

20
176
Power Storage Element
172
172
172
168
Power Storage Element
172
182
180
186
178
184
32

AIRCRAFT PROPULSION SYSTEM NACELLE WALL WITH INTEGRATED POWER STORAGE

BACKGROUND OF THE DISCLOSURE

1. Technical Field

This disclosure relates generally to an aircraft and, more particularly, to an electrical system for an aircraft propulsion system.

2. Background Information

An aircraft propulsion system includes an electrical system to distribute electricity to various electrical devices. Various types and configurations of electrical systems for an aircraft propulsion system are known in the art. While these known electrical systems have various benefits, there is still room in the art for improvement.

SUMMARY OF THE DISCLOSURE

According to an aspect of the present disclosure, an assembly is provided for an aircraft propulsion system. This assembly includes an engine case, a nacelle wall and a power storage integrated with the nacelle wall. The engine case is configured to house at least one bladed rotor of a turbine engine. The engine case extends axially along and circumferentially about an axis. The nacelle wall extends axially along and circumferentially about the engine case. The nacelle wall is spaced radially outboard from the engine case with a housing compartment radially between the engine case and the nacelle wall. The power storage is radially separated from the engine case by the housing compartment.

According to another aspect of the present disclosure, a propulsion system is provided for an aircraft. This propulsion system includes a propulsor section, an engine core, an inner housing structure, an outer housing structure and a battery pack. The engine core is configured to power operation of the propulsor section. The engine core includes a compressor section, a combustor section and a turbine section. The inner housing structure is configured to house the engine core. The inner housing structure includes a nacelle wall configured to form an inner peripheral boundary of a flowpath that bypasses the engine core. The outer housing structure is configured to house the propulsor section and is spaced radially outboard from the inner housing structure. The outer housing structure is also configured to form an outer peripheral boundary of the flowpath that bypasses the engine core. The battery pack includes a plurality of batteries. The battery pack is attached to the nacelle wall.

According to still another aspect of the present disclosure, another propulsion system is provided for an aircraft. This propulsion system includes a propulsor section, an engine core, an inner housing structure, an outer housing structure and a battery pack. The engine core is configured to power operation of the propulsor section. The engine core includes a compressor section, a combustor section and a turbine section. The inner housing structure is configured to house the engine core. The inner housing structure is also configured to form an inner peripheral boundary of a flowpath that bypasses the engine core. The outer housing structure is configured to house the propulsor section and is spaced radially outboard from the inner housing structure. The outer housing structure includes a nacelle wall configured to form an outer peripheral boundary of the flowpath that bypasses the engine core. The battery pack includes a plurality of batteries. The battery pack is attached to the nacelle wall.

The outer housing structure may include a nacelle inlet structure, and the nacelle inlet structure may include the nacelle wall.

The outer housing structure may include a fan cowl, and the fan cowl may include the nacelle wall.

The outer housing structure may include a thrust reverser structure, and the thrust reverser structure may include the nacelle wall.

The power storage may include one or more batteries.

The power storage may be connected to the nacelle wall.

The power storage may include a power storage housing and a power storage element. The power storage housing may be attached to the nacelle wall at an inner side of the nacelle wall. The power storage element may be housed within an interior of the power storage housing.

The power storage may include a power storage housing and a power storage element. An outer wall of the power storage housing may be formed by the nacelle wall. The power storage element may be housed within an interior of the power storage housing.

The assembly may also include a core of the turbine engine. The core may include a compressor section, a combustor section and a turbine section. The compressor section or the turbine section may include the bladed rotor. The engine case may house the core.

The assembly may also include a propulsor section of the turbine engine. The propulsor section may include the bladed rotor. The engine case may house the propulsor section.

The aircraft propulsion system may be a turbofan propulsion system with a bypass flowpath. The nacelle wall may form a radial inner peripheral boundary of the bypass flowpath.

The aircraft propulsion system may be a turbofan propulsion system with a bypass flowpath. The engine case may form a radial outer peripheral boundary of the bypass flowpath.

The nacelle wall may be configured to form an exterior peripheral boundary of the aircraft propulsion system which borders an environment external to the aircraft propulsion system.

The assembly may also include an inner fixed structure, and the inner fixed structure may include the nacelle wall.

The assembly may also include a fan cowl, and the fan cowl may include the nacelle wall.

The power storage may circumferentially overlap between five percent and forty-five percent of the engine case.

The power storage may circumferentially overlap between forty-five percent and ninety percent of the engine case.

The assembly may also include a working fluid system in thermal communication with the power storage. The working fluid system may be configured to regulate a temperature of the power storage.

The assembly may also include a working fluid system, and the working fluid system may include a fluid circuit. The fluid circuit may extend through the power storage. The working fluid system may be configured to direct air through the fluid circuit and transfer heat energy between the air and the power storage.

The air may be compressor bleed air.

The air may be bypass bleed air.

The assembly may also include a working fluid system comprising a fluid circuit. The fluid circuit may extend through the power storage. The working fluid system may be configured to direct liquid working fluid through the fluid circuit and transfer heat energy between the liquid working fluid and the power storage.

The liquid working fluid may be or otherwise include lubricant.

The liquid working fluid may be or otherwise include coolant.

The liquid working fluid may be or otherwise include fuel.

The assembly may also include an electric machine and an electric machine controller. The electric machine may be configurable as an electric motor and/or an electric generator. The electric machine controller may be configured to control operation of the electric machine. The electric machine controller may be electrically coupled between the electric machine and the power storage.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
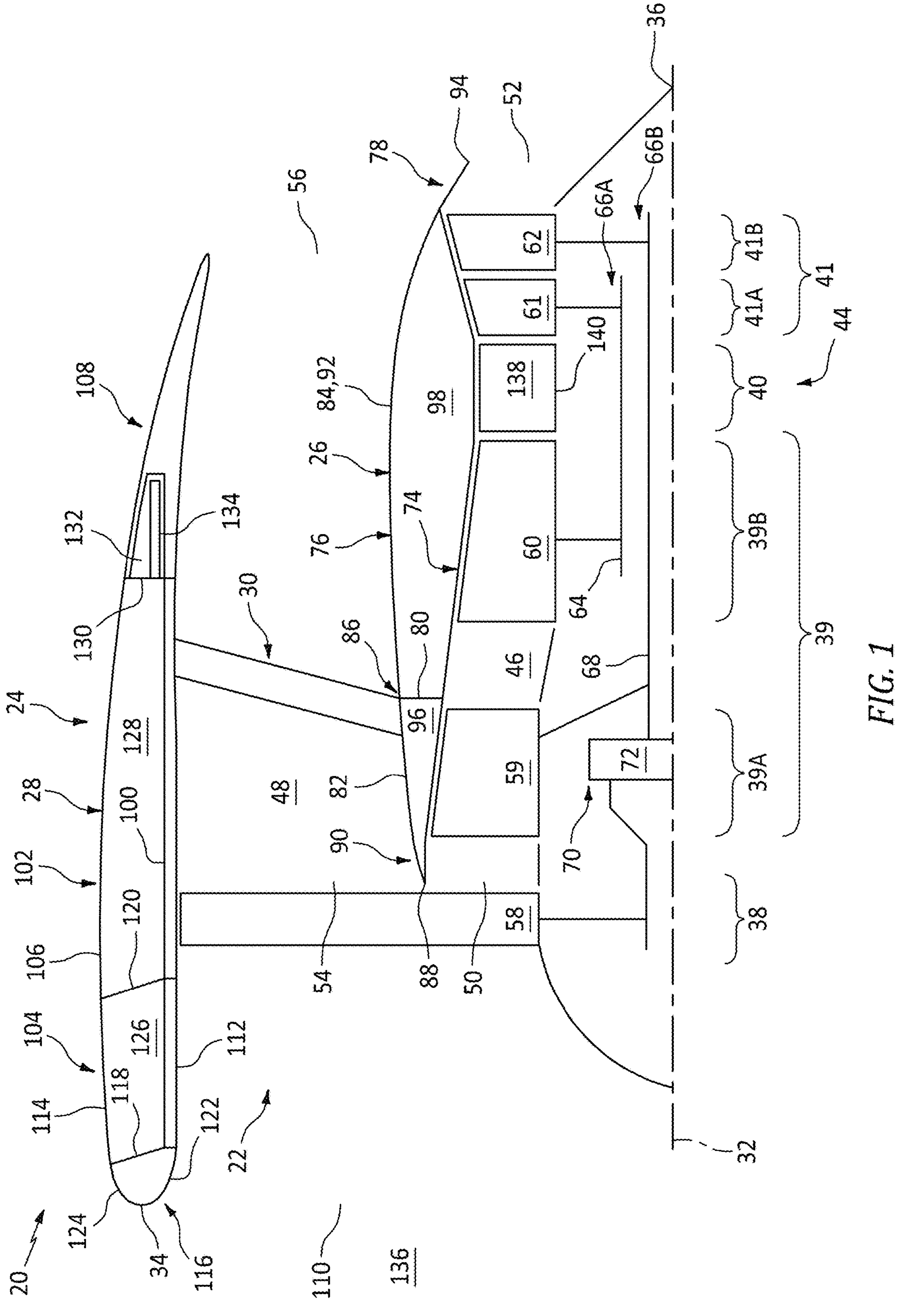
FIG. 1 is a partial schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. For ease of description, the aircraft propulsion system 20 is described below as a turbofan propulsion system. The present disclosure, however, is not limited to such an exemplary aircraft propulsion system. The aircraft propulsion system 20, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system.

The aircraft propulsion system 20 includes a gas turbine engine 22 (e.g., a turbofan engine) housed within a stationary propulsion system housing 24. This propulsion system housing 24 of FIG. 1 includes an inner housing structure 26, an outer housing structure 28 and a guide vane structure 30 (e.g., a fan exit guide vane (FEGV) structure) extending radially between and connected to the inner housing structure 26 and the outer housing structure 28. The aircraft propulsion system 20 extends axially along an axis 32 of the aircraft propulsion system 20 between an axial upstream, forward end 34 of the aircraft propulsion system 20 and an axial downstream, aft end 36 of the aircraft propulsion system 20. Briefly, the propulsion system axis 32 may be a centerline axis of the aircraft propulsion system 20, the turbine engine 22 and/or one or more of its members. The propulsion system axis 32 may also or alternatively be a rotational axis for one or more members of the turbine engine 22.

The aircraft propulsion system 20 and its turbine engine 22 of FIG. 1 include a propulsor section 38 (e.g., a fan section), a compressor section 39, a combustor section 40 and a turbine section 41. The compressor section 39 of FIG. 1 includes a low pressure compressor (LPC) section 39A and a high pressure compressor (HPC) section 39B. The turbine section 41 of FIG. 1 includes a high pressure turbine (HPT) section 41A and a low pressure turbine (LPT) section 41B. At least (or only) the LPC section 39A, the HPC section 39B, the combustor section 40, the HPT section 41A and the LPT section 41B collectively form a core 44 (e.g., a gas generator) of the turbine engine 22. The aircraft propulsion system 20 and its turbine engine 22 of FIG. 1 also include a core flowpath 46 (e.g., an annular core flowpath) and a bypass flowpath 48 (e.g., an annular bypass flowpath). The core flowpath 46 extends sequentially through the LPC section 39A, the HPC section 39B, the combustor section 40, the HPT section 41A and the LPT section 41B from an airflow inlet 50 into the core flowpath 46 to a combustion products exhaust 52 out from the core flowpath 46. The bypass flowpath 48 extends through a bypass duct from an airflow inlet 54 into the bypass flowpath 48 to an airflow exhaust 56 from the bypass flowpath 48, where the bypass duct may be formed by the inner housing structure 26 and the outer housing structure 28. The bypass flowpath 48 and its bypass duct are configured to bypass (e.g., are disposed radially outboard of and extend along) the engine core 44 and the inner housing structure 26.

The propulsor section 38, the LPC section 39A, the HPC section 39B, the combustor section 40, the HPT section 41A and the LPT section 41B may be arranged sequentially along the propulsion system axis 32 within the propulsion system housing 24. The propulsor section 38 includes a bladed propulsor rotor 58; e.g., a fan rotor. The LPC section 39A includes a bladed low pressure compressor (LPC) rotor 59. The HPC section 39B includes a bladed high pressure compressor (HPC) rotor 60. The HPT section 41A includes a bladed high pressure turbine (HPT) rotor 61. The LPT section 41B includes a bladed low pressure turbine (LPT) rotor 62. Each of these engine rotors 58-62 includes a rotor base (e.g., a disk or a hub) and a plurality of rotor blades (e.g., airfoils, vanes, etc.). The rotor blades may be arranged into one or more stages axially along the respective engine rotor 58-62. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 60 is coupled to and rotatable with the HPT rotor 61. The HPC rotor 60 of FIG. 1, for example, is connected to the HPT rotor 61 through a high speed shaft 64. At least (or only) the HPC rotor 60, the HPT rotor 61 and the high speed shaft 64 collectively form a high speed rotating structure 66A; e.g., a high speed spool of the turbine engine 22 and its engine core 44. This high speed rotating structure 66A of FIG. 1 and its members 60, 61 and 64 are rotatable about the propulsion system axis 32. However, it is contemplated the high speed rotating structure 66A may alternatively be rotatable about another axis radially and/or angularly offset from the rotational axis of the propulsor rotor 58 and/or the centerline axis of the turbine engine 22.

The LPC rotor 59 is coupled to and rotatable with the LPT rotor 62. The LPC rotor 59 of FIG. 1, for example, is connected to the LPT rotor 62 through a low speed shaft 68. At least (or only) the LPC rotor 59, the LPT rotor 62 and the low speed shaft 68 collectively form a low speed rotating structure 66B; e.g., a low speed spool of the turbine engine 22 and its engine core 44. This low speed rotating structure 66B of FIG. 1 and its members 59, 62 and 68 are rotatable about the propulsion system axis 32. However, it is contemplated the low speed rotating structure 66B may alternatively be rotatable about another axis radially and/or angularly offset from the rotational axis of the propulsor rotor 58 and/or the centerline axis of the turbine engine 22.

The low speed rotating structure 66B is coupled to the propulsor rotor 58 through a rotating structure-to-propulsor (RSP) drivetrain 70. The RSP drivetrain 70 may be configured as a geared drivetrain, where a geartrain 72 (e.g., a transmission, a speed change device, an epicyclic geartrain, etc.) is disposed between and operatively couples the propulsor rotor 58 to the low speed rotating structure 66B and its LPT rotor 62. With this arrangement, the propulsor rotor 58 may rotate at a different (e.g., slower) rotational speed than the low speed rotating structure 66B and its LPT rotor 62. Here, the propulsor rotor 58 and the low speed rotating structure 66B may rotate in a common (the same) direction about the propulsion system axis 32 or in opposite directions about the propulsion system axis 32 depending, for example, upon the specific configuration of the geartrain 72. Alternatively, the RSP drivetrain 70 may be configured as a direct-drive drivetrain, where the geartrain 72 is omitted. With such an arrangement, the propulsor rotor 58 rotates at a common (the same) rotational speed as the low speed rotating structure 66B and its LPT rotor 62.

The inner housing structure 26 is configured to support the engine sections 38-41B and provide an aerodynamic cover over the engine core 44. This inner housing structure 26 is also configured to form a radial inner peripheral boundary of the bypass flowpath 48. The inner housing structure 26 of FIG. 1, for example, includes an inner case 74 (e.g., a core engine case) for the turbine engine 22 and its engine core 44, an inner wall structure 76, a core exhaust nozzle structure 78 and a bulkhead 80 (e.g., a firewall).

The inner case 74 is disposed radially outboard of the engine sections 39A-41B and, more particularly, the engine rotors 59-62 and a combustor 140 (e.g., an annular combustor). The inner case 74 also extends axially along (e.g., axially overlaps) and extends circumferentially about (e.g., circumscribes) the engine sections 39A-41B and, more particularly, the engine rotors 59-62 and the combustor 140. The engine rotating structures 66A and 66B (generally referred to as "66") as well as the propulsor rotor 58 may be rotationally coupled to the inner case 74 through one or more internal support structures; e.g., frames. The combustor 140 and a stationary component of the geartrain 72 may be fixedly coupled to the inner case 74 through one or more internal support structures (not shown in FIG. 1 for clarity of illustration). The inner case 74 may thereby structurally support the engine core 44 as well as the propulsor rotor 58 and the RSP drivetrain 70.

The inner wall structure 76 is configured to provide the aerodynamic cover over the engine core 44 and its inner case 74. This inner wall structure 76 is also configured to form the inner peripheral boundary of the bypass flowpath 48. The inner wall structure 76 of FIG. 1, for example, includes an inner flowpath wall 82 (e.g., an outer casing of the inner housing structure 26) and an inner nacelle structure 84 (e.g., an inner fixed structure (IFS)). The inner flowpath wall 82 may form a radial inner platform for the guide vane structure 30. The inner flowpath wall 82 of FIG. 1, for example, projects axially in an upstream, forward direction from an axial interface 86 with the inner nacelle structure 84 to a leading edge 88 of a splitter structure 90. Here, the interface 86 of FIG. 1 is located at an axial downstream, aft end of the guide vane structure 30. In other embodiments, however, it is contemplated the interface 86 may be located downstream of the vane structure aft end along the bypass flowpath 48. Referring again to FIG. 1, the inner flowpath wall 82 extends axially along and may circumscribe at least a forward section of the inner case 74. The leading edge 88 of the splitter structure 90 forms a radial outer peripheral boundary of the core inlet 50 and a radial inner peripheral boundary of the bypass inlet 54. An inner barrel 92 of the inner nacelle structure 84 of FIG. 1 extends axially in a downstream, aft direction from the interface 86 to the core exhaust nozzle structure 78. The inner nacelle structure 84 extends axially along and circumferentially about an aft section of the inner case 74. A trailing edge 94 of the core exhaust nozzle structure 78 forms a radial outer peripheral boundary of the core exhaust 52.

The bulkhead 80 projects radially out from the inner case 74 to the inner flowpath wall 82. The bulkhead 80 is also mechanically fastened and/or otherwise attached to the inner case 74 and the inner flowpath wall 82. The bulkhead 80 of FIG. 1, in particular, is attached to the inner flowpath wall 82 at the interface 86. The bulkhead 80 extends circumferentially about (e.g., completely around) the inner case 74 and the propulsion system axis 32. This bulkhead 80 may be configured as a firewall or other barrier spatially and/or fluidly dividing a forward inner housing compartment 96 of the inner housing structure 26 from an aft inner housing compartment 98 (e.g., an engine core compartment) of the inner housing structure 26. The forward inner housing compartment 96 may be formed by and extend radially between the inner case 74 and the inner flowpath wall 82. This forward inner housing compartment 96 extends axially along the inner case 74 and the inner flowpath wall 82 in the downstream, aft direction to the bulkhead 80. The aft inner housing compartment 98 may be formed by and extend radially between the inner case 74 and the inner nacelle structure 84. This aft inner housing compartment 98 may also extend axially along the inner case 74 and the inner nacelle structure 84 in the upstream, forward direction to the bulkhead 80.

The outer housing structure 28 is configured to provide an aerodynamic cover over the propulsor section 38. The outer housing structure 28 is also configured to form a radial outer peripheral boundary of the bypass flowpath 48. The outer housing structure 28 of FIG. 1, for example, includes an outer case 100 (e.g., a fan engine case) for the turbine engine 22 and its propulsor section 38, and an outer nacelle structure 102. The outer nacelle structure 102 of FIG. 1 includes a forward nacelle inlet structure 104, an outer nacelle cowl 106 (e.g., a fan cowl with multiple cowl doors) and an aft thrust reverser structure 108.

The outer case 100 is disposed radially outboard of the propulsor section 38 and its propulsor rotor 58. The outer case 100 is spaced radially outboard of the inner nacelle structure 84. The outer case 100 also extends axially along (e.g., axially overlaps) and extends circumferentially about (e.g., circumscribes) the propulsor section 38 and its propulsor rotor 58 as well as the inner nacelle structure 84 and the guide vane structure 30. This outer case 100 may thereby house and may be configured as a containment structure for the propulsor section 38 and its propulsor rotor 58. An aft portion of the outer case 100 may also form a forward portion of the outer peripheral boundary of the bypass flowpath 48.

The nacelle inlet structure 104 is disposed at the propulsion system forward end 34. The nacelle inlet structure 104 is configured to direct a stream of air through an airflow inlet 110 into the aircraft propulsion system 20 and to the propulsor section 38. The nacelle inlet structure 104 of FIG. 1, for example, includes an inner barrel 112, an outer barrel 114, an inlet lip 116 (e.g., a nose lip) and one or more bulkheads 118 and 120. This nacelle inlet structure 104 and each of its members 112, 114, 116, 118 and 120 may extend circumferentially about (e.g., completely around) the propulsion system axis 32. The inner barrel 112 extends axially along the propulsion system axis 32 from an axial upstream, forward end of the outer case 100 (e.g., at an intersection between the outer case 100 and the aft bulkhead 120) to an axial downstream, aft end of a radial inner portion 122 of the inlet lip 116 (e.g., at an intersection between the inner barrel 112 and the forward bulkhead 118). The outer barrel 114 is spaced radially outboard from the inner barrel 112. This outer barrel 114 extends axially along the propulsion system axis 32 from an axial upstream, forward end of the nacelle cowl 106 (e.g., at an intersection between the outer barrel 114 and the aft bulkhead 120) to an axial downstream, aft end of a radial outer portion 124 of the inlet lip 116 (e.g., at an intersection between the outer barrel 114 and the forward bulkhead 118). The inner and the outer portions 122 and 124 of the inlet lip 116 meet at a leading edge of the outer nacelle structure 102 and its inlet lip 116. Each of the bulkheads 118, 120 projects radially out from the inner barrel 112 to the outer barrel 114. The forward bulkhead 118 is disposed at the aft ends of the inlet lip 116. The aft bulkhead 120 is disposed at an axial downstream, aft end of the outer barrel 114. With this arrangement, the nacelle inlet structure 104 is configured with a forward outer housing compartment 126. This forward outer housing compartment 126 is formed by and extends radially between the inner barrel 112 and the outer barrel 114. The forward outer housing compartment 126 is also formed by and extends axially between the forward bulkhead 118 and the aft bulkhead 120.

The nacelle cowl 106 is disposed axially between the nacelle inlet structure 104 and the thrust reverser structure 108. The nacelle cowl 106 of FIG. 1, for example, extends axially along the propulsion system axis 32 from the aft end of the outer barrel 114 to an axial upstream, forward end of the thrust reverser structure 108. The nacelle cowl 106 is spaced radially outboard from the outer case 100. The nacelle cowl 106 extends circumferentially about the outer case 100 and the propulsion system axis 32. With this arrangement, the outer housing structure 28 is configured with an intermediate outer housing compartment 128 (e.g., a fan case compartment). This intermediate outer housing compartment 128 is formed by and extends radially between the outer case 100 and the nacelle cowl 106. The intermediate outer housing compartment 128 is also formed by and extends axially between the aft bulkhead 120 and a bulkhead 130 (e.g., a torque box) of the thrust reverser structure 108.

The thrust reverser structure 108 is disposed at the bypass exhaust 56. This thrust reverser structure 108 forms an aft portion of the outer peripheral boundary of the bypass flowpath 48. During a forward thrust mode of operation, the thrust reverser structure 108 is configured to block flow into a thrust reverser passage (not visible in FIG. 1) such that substantially all of the bypass air is directed out of the aircraft propulsion system 20 through the bypass exhaust 56 in the aft direction. During a reverse thrust mode of operation, the thrust reverser structure 108 is configured to redirect at least some of the bypass air radially out of the bypass flowpath 48, through the thrust reverser passage, and out of the aircraft propulsion system 20 in a radially outward and axially forward direction. The thrust reverser structure 108 of FIG. 1 may be configured as a translating sleeve thrust reverser, a pivoting door (e.g., a clamshell) thrust reverser, or otherwise. This thrust reverser structure 108 may include an aft outer housing compartment 132; e.g., an internal compartment housing a cascade structure 134 during the forward thrust mode of operation.

During operation of the aircraft propulsion system 20 of FIG. 1, ambient air from an environment 136 external to the aircraft and its aircraft propulsion system 20 enters the aircraft propulsion system 20 and its turbine engine 22 through the propulsion system inlet 110. This air is propelled by the rotating propulsor rotor 58 in the aft direction towards the propulsion system aft end 36.

An outer stream of the air propelled by the rotating propulsor rotor 58 is directed into the bypass flowpath 48 through its bypass inlet 54, which air entering the bypass flowpath 48 may be referred to as "bypass air". The guide vane structure 30 conditions (e.g., straightens out, de-swirls, etc.) the flow of the bypass air within the bypass duct. This conditioned bypass air is subsequently directed out of the aircraft propulsion system 20 through the bypass exhaust 56 to provide forward thrust. This propulsion of the bypass air may account for a majority of the forward thrust generated by the aircraft propulsion system 20 and its turbine engine 22 of FIG. 1.

An inner stream of the air propelled by the rotating propulsor rotor 58 is directed into the core flowpath 46 through its core inlet 50, which air entering the core flowpath 46 may be referred to as "core air". This core air is compressed by the LPC rotor 59 and the HPC rotor 60 and is directed into a combustion chamber 138 (e.g., annular combustion chamber) of the combustor 140 in the combustor section 40. Fuel is injected into the combustion chamber 138 by one or more fuel injectors and mixed with the compressed core air to provide a fuel-air mixture. This fuel-air mixture is ignited and combustion products thereof flow through and sequentially drive rotation of the HPT rotor 61 and the LPT rotor 62. The rotation of the HPT rotor 61 and the LPT rotor 62 respectively drive rotation of the HPC rotor 60 and the LPC rotor 59 and, thus, compression of the air received from the core inlet 50. The rotation of the LPT rotor 62 also drives rotation of the propulsor rotor 58 through the RSP drivetrain 70.

While the turbine engine 22 is described above with a particular two rotating structure arrangement (e.g., a two-spool architecture), the present disclosure is not limited thereto. For example, the LPC rotor 59 may be omitted to configure the LPT rotor 62 as a power turbine (PT) rotor for the propulsor rotor 58. The turbine engine 22 may also or alternatively include another rotating structure with a bladed compressor rotor in the compressor section 39 and a bladed turbine rotor in the turbine section 41; e.g., an intermediate speed spool for the engine core 44.

Figure 2:
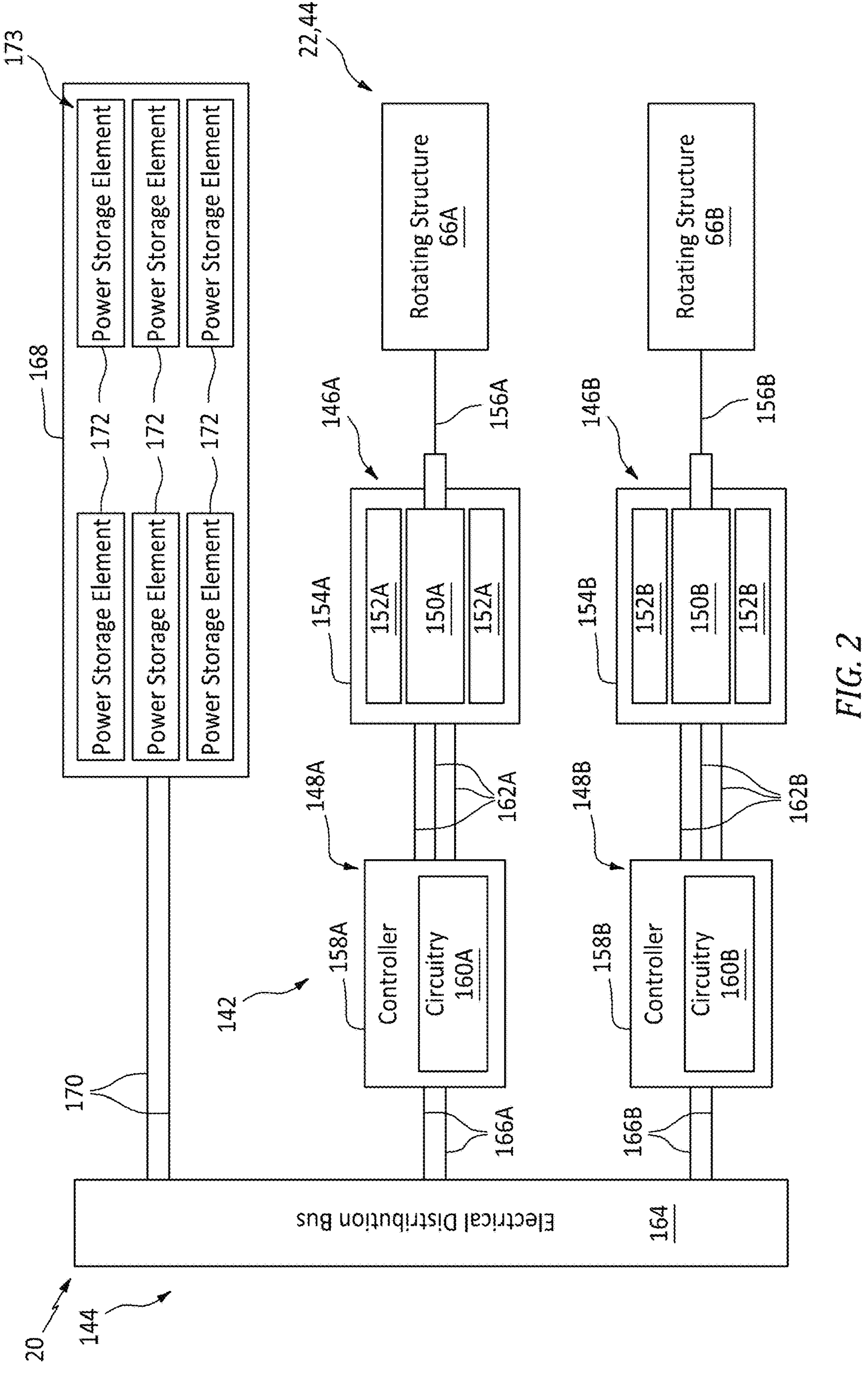
FIG. 2 is a schematic illustration of a portion of the aircraft propulsion system with an electric machine system and an electrical system.

Referring to FIG. 2, the aircraft propulsion system 20 also includes an electric machine system 142 and an electrical system 144 electrically coupled to the electric machine system 142. The electric machine system 142 of FIG. 2 includes one or more electric machines 146A and 146B (generally referred to as "146") and one or more electric machine (EM) controllers 148A and 148B (generally referred to as "148"). For ease of description, each electric machine 146 of FIG. 2 is described below as being electrically coupled to, controlled by and/or otherwise associated with a single, dedicated one of the EM controllers 148. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 146A, 146B of FIG. 2 includes an electric machine rotor 150A, 150B (generally referred to as "150"), an electric machine stator 152A, 152B (generally referred to as "152") and an electric machine housing 154A, 154B (generally referred to as "154"); e.g., a case. The machine rotor 150 is rotatable about a rotational axis of the machine rotor 150. The machine stator 152 is disposed next to and in electromagnetic communication with the machine rotor 150. The machine stator 152 of FIG. 2, in particular, is radially outboard of and circumscribes the machine rotor 150. With this arrangement, each electric machine 146 is configured as a radial flux electric machine. The electric machines 146 of the present disclosure, however, are not limited to such an exemplary rotor-stator configuration nor to radial flux arrangements. The machine rotor 150, for example, may alternatively be radially outboard of and circumscribe the machine stator 152. In another example, the machine rotor 150 may be axially next to the machine stator 152 configuring the respective electric machine 146 as an axial flux electric machine. Referring again to FIG. 2, the machine rotor 150 and the machine stator 152 are at least partially or completely housed within an interior of the machine housing 154.

Each electric machine 146 is operatively coupled to a respective one of the engine rotating structures 66. Each machine rotor 150A, 150B of FIG. 2, for example, is mechanically coupled to the respective engine rotating structure 66A, 66B through a respective drivetrain 156A, 156B (generally referred to as "156"); schematically shown. This drivetrain 156 may be configured as or otherwise include a shaft, an accessory gearbox, a tower shaft assembly, an angle gearbox, and/or the like. For ease of description, each machine rotor 150 of FIG. 2 is described below as being coupled to and rotatable with a unique one of the engine rotating structures 66 of the aircraft propulsion system 20. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system.

Each electric machine 146 of FIG. 2 may be configurable as an electric motor and/or an electric generator; e.g., an electric motor-generator. For example, during a motor mode of operation, a respective electric machine 146 may operate as the electric motor to convert electricity received from the electrical system 144. The machine stator 152, for example, may generate an electromagnetic field with the machine rotor 150 using a current of electricity received from the electrical system 144 through the respective EM controller 148. This electromagnetic field may drive rotation of the machine rotor 150. The machine rotor 150, in turn, may provide mechanical power to and drive rotation of the respective engine rotating structure 66 through the respective drivetrain 156. This mechanical power may be provided to boost power or completely power the rotation of the respective engine rotating structure 66. By contrast, during a generator mode of operation, the electric machine 146 may operate as the electric generator to convert mechanical power received from the respective engine rotating structure 66 into electricity. Rotation of the machine rotor 150, for example, may be rotationally driven by rotation of the respective engine rotating structure 66 through the respective drivetrain 156. The rotation of the machine rotor 150 may generate an electromagnetic field with the machine stator 152, and the machine stator 152 may convert energy from the electromagnetic field into electricity. The respective electric machine 146 may then provide a current of electricity to the electrical system 144 through the respective EM controller 148 for storage and/or further use. The electric machines 146 of the present disclosure, however, are not limited to such exemplary operation. For example, one, some or all of the electric machines 146 may alternatively each be configured as a dedicated electric generator; e.g., without the electric motor functionality. One, some or all of the electric machines 146 may alternatively each be configured as a dedicated electric motor; e.g., without the electric generator functionality.

Each EM controller 148A, 148B includes a controller housing 158A, 158B (generally referred to as "158") and internal controller circuitry 160A, 160B (generally referred to as "160"). The controller housing 158 may be configured as an enclosed case (e.g., a closed or sealed container) for the respective controller circuitry 160. The controller circuitry 160 is disposed within an interior of the controller housing 158; e.g., an internal chamber or other volume(s) within and enclosed by the controller housing 158. The controller circuitry 160 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 148A, 148B is electrically coupled to a respective one of the electric machines 146A, 146B through, for example, one or more electrical couplings 162A, 162B (generally referred to as "162"). The controller circuitry 160 of each EM controller 148 of FIG. 2, for example, is electrically coupled to the respective electric machine 146 and its machine stator 152 through the respective electric couplings 162. Similarly, each EM controller 148A, 148B is electrically coupled to an electrical distribution bus 164 of the electrical system 144 through, for example, one or more electric couplings 166A, 166B (generally referred to as "166"). The controller circuitry 160 of each EM controller 148 of FIG. 2, for example, is electrically coupled to the electrical system 144 and its electrical distribution bus 164 through the respective electric couplings 166. Examples of the electrical couplings 162 and 166 include, but are not limited to, high voltage electric cables, power feeder cables, power buses, and/or the like.

Each EM controller 148 and its controller circuitry 160 are configured to control operation of a respective one of the electric machines 146. For example, when operating as the electric motor, the respective EM controller 148 and its controller circuitry 160 are configured to regulate a flow of electricity from the electrical system 144 to the respective electric machine 146. This electricity flow regulation may include: (a) turning-on the flow of electricity from the electrical system 144 to the respective electric machine 146 (e.g., electrically coupling the respective electric machine 146 to the electrical system 144); (b) turning-off the flow of electricity from the electrical system 144 to the respective electric machine 146 (e.g., electrically decoupling the respective electric machine 146 from the electrical system 144); (c) moderating the flow of electricity from the electrical system 144 to the respective electric machine 146. Here, the respective EM controller 148 operates as a motor controller. In another example, when operating as the electric generator, the respective EM controller 148 and its controller circuitry 160 are configured to regulate a flow of electricity from the respective electric machine 146 to the electrical system 144. This electricity flow regulation may include: (a) turning-on the flow of electricity from the respective electric machine 146 to the electrical system 144 (e.g., electrically coupling the respective electric machine 146 to the electrical system 144); (b) turning-off the flow of electricity from the respective electric machine 146 to the electrical system 144 (e.g., electrically decoupling the respective electric machine 146 from the electrical system 144); (c) moderating the flow of electricity from the respective electric machine 146 to the electrical system 144. Here, the respective EM controller 148 operates as a generator controller.

The electrical system 144 includes the electrical distribution bus 164 and a power storage 168 (or multiple power storages). The electrical distribution bus 164 is electrically coupled to the electric machines 146 through their respective EM controllers 148 as described above. The electrical distribution bus 164 is electrically coupled to the power storage 168 through, for example, one or more electric couplings 170. Examples of the electrical couplings 170 include, but are not limited to, high voltage electric cables, power feeder cables, power buses, and/or the like. With this arrangement, the electrical distribution bus 164 provides an intermediate connection between the various electrical members 146A (via 148A), 146B (via 148B) and/or 168. The power storage 168 may thereby receive electricity generated by one or more of the electric machines 146 (when operated as electric generators) through the electrical distribution bus 164. Similarly, one or more of the electric machines 146 (when operated as electric motors) may receive electricity from the power storage 168 through the electrical distribution bus 164. Moreover, it is contemplated the electrical distribution bus 164 may (or may not) also be electrically coupled to and provide the intermediate connection with one or more additional electric components of the aircraft propulsion system 20 and/or one or more additional electric components of the aircraft outside of the aircraft propulsion system 20. Examples of the additional electric components of the aircraft propulsion system 20 include, but are not limited to, sensors, actuators, pumps, valves, an electronic engine controller for the turbine engine 22, and/or the like. Examples of the additional electric components of the aircraft outside of the aircraft propulsion system 20 include, but are not limited to, electric devices mounted with an airframe of the aircraft, electric devices onboard a companion aircraft propulsion system, other electric power sources such as an auxiliary power unit (APU) or fuel cells, and/or the like.

The power storage 168 is configured to receive electricity from the electrical distribution bus 164 and store that received electricity as potential energy. The power storage 168 is also configured to release the stored potential energy as electricity output into the electrical distribution bus 164. The power storage 168 of FIG. 2, for example, includes one or more power storage elements 172 (an exemplary set of which are shown in the drawings). For ease of description, these power storage elements 172 are described herein as batteries. Each of these batteries is a rechargeable battery with one or more cells. With such an arrangement, the power storage 168 and its power storage elements 172 may store the received electricity as chemical potential energy. The power storage 168 of the present disclosure, however, is not limited to such an exemplary arrangement. For example, is it contemplated one or more of the power storage elements 172 may alternatively be configured as capacitors; e.g., supercapacitors. With such an arrangement, those power storage elements 172 may store the received electricity as electrostatic potential energy.

Figure 3:
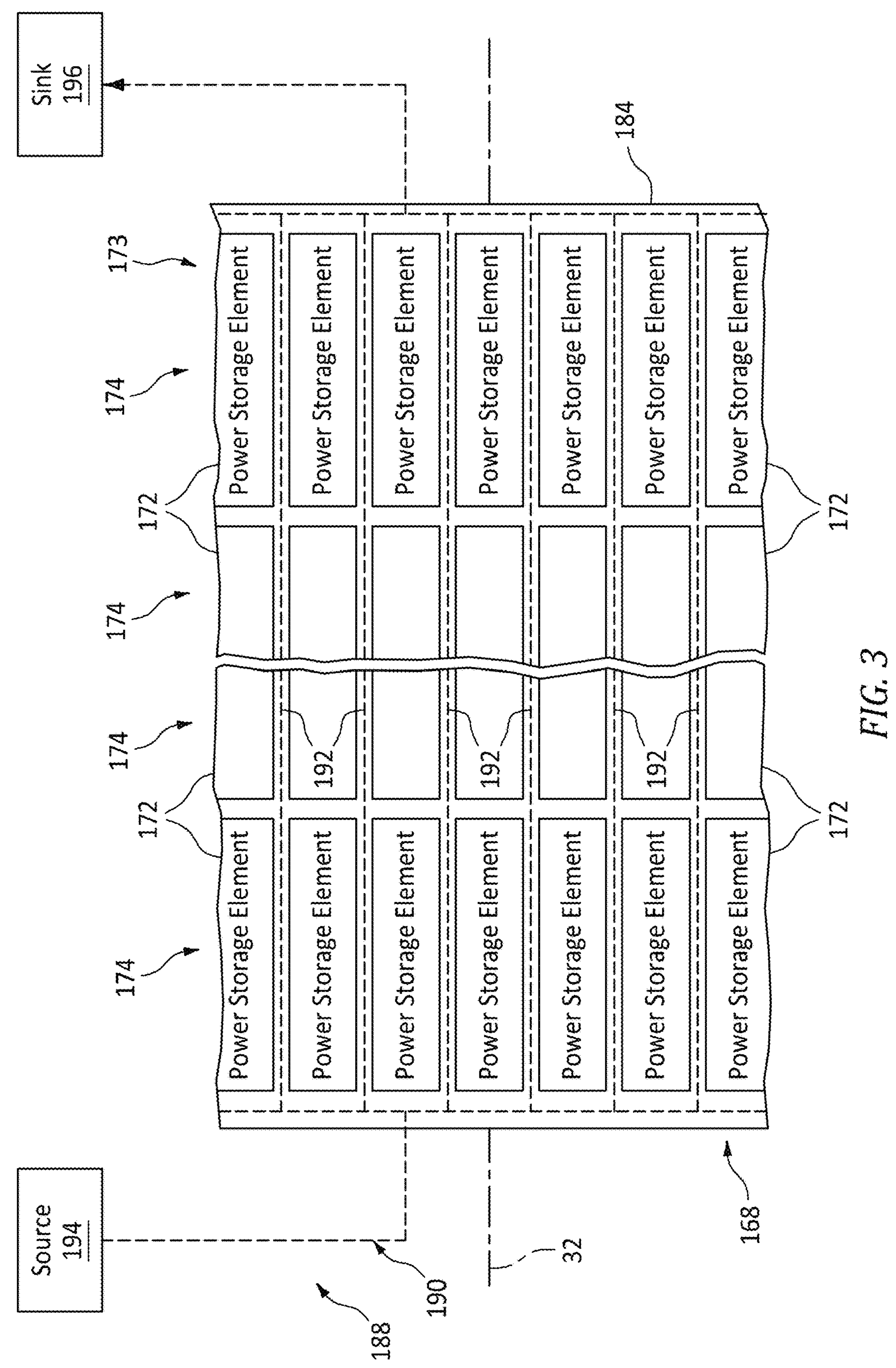
FIG. 3 is a plan view illustration of a portion of a power storage arranged with a working fluid system.
Figure 4:
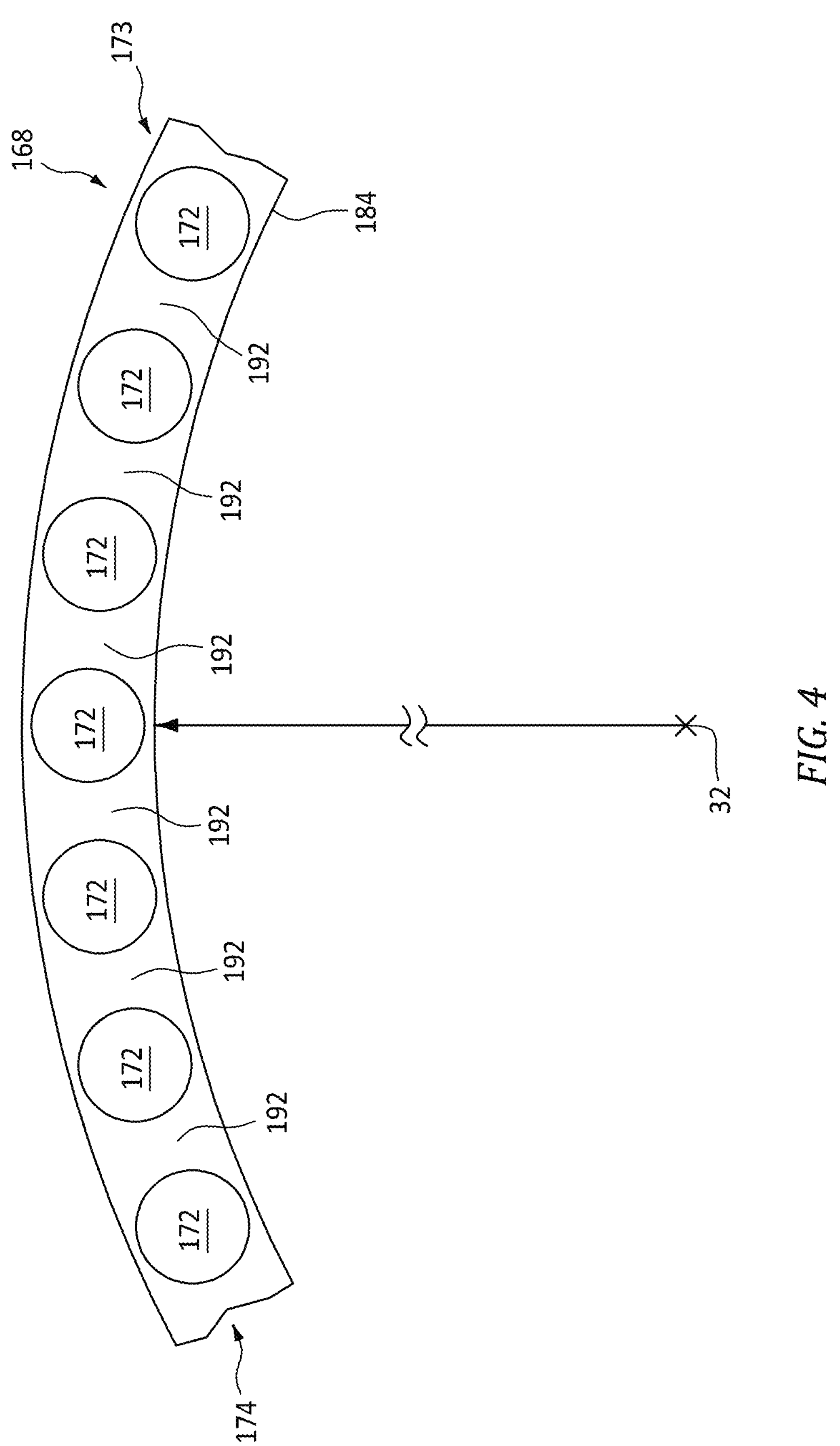
FIG. 4 is a partial cross-sectional illustration of the power storage.

Referring to FIG. 3, the power storage elements 172 may be arranged in a power storage element array 173; e.g., a battery pack. This power storage element array 173 includes one or more rows 174 of the power storage elements 172. The power storage element rows 174 may be arranged side-by-side axially along the propulsion system axis 32. Each of the power storage element rows 174 may include a set of one or more of the power storage elements 172. The power storage elements 172 in each power storage element row 174 may be arranged side-by-side circumferentially about the propulsion system axis 32. With this arrangement, referring to FIG. 4, the power storage element array 173 may be configured with an arcuate geometry. For ease of description, the power storage 168 is described herein with a single power storage element radial depth; e.g., a single layered power storage element array 173. However, it is contemplated the power storage 168 may alternatively include a radial stack of the power storage elements 172; e.g., a multi-layered power storage element array 173.

Figure 5A:
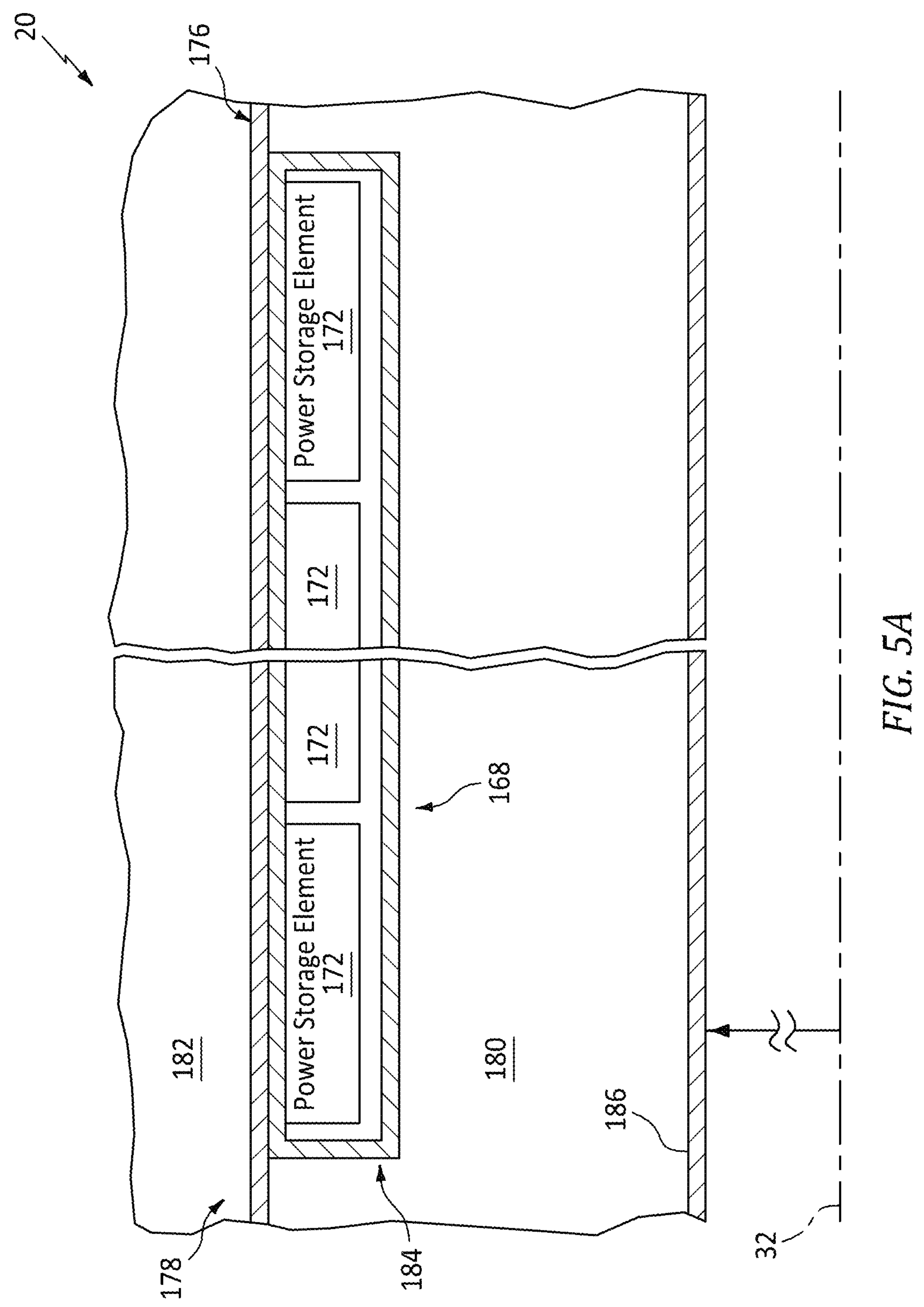
FIGS. 5A and 5B are partial sectional illustrations of a housing structure of the aircraft propulsion system with various power storage arrangements.
Figure 5B:
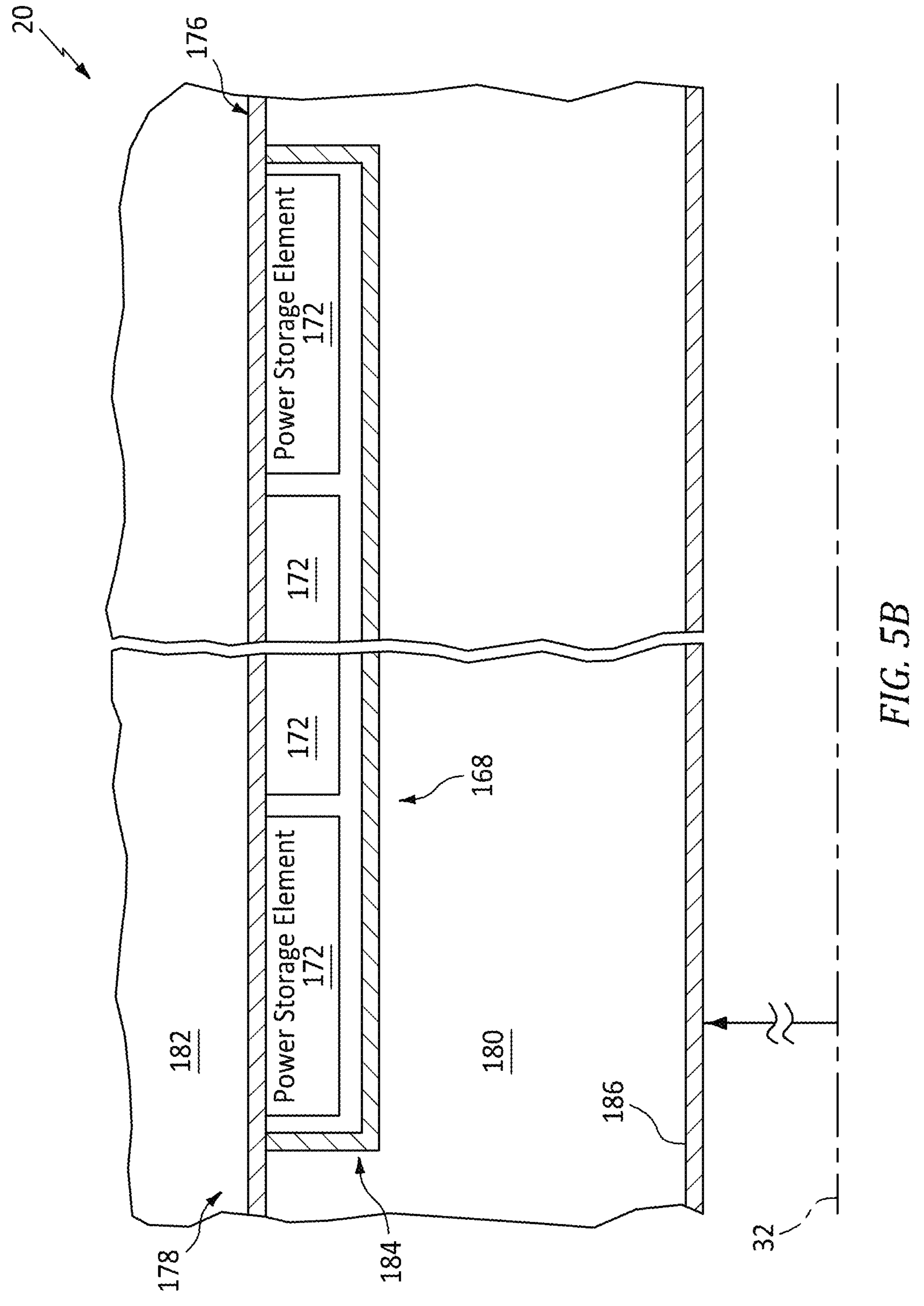

FIGS. 5A and 5B illustrate the power storage 168 and its power storage elements 172 arranged with a nacelle wall 176 of a structure 178 of the propulsion system housing 24. This nacelle wall 176 is disposed radially between a housing compartment 180 internal to the housing structure 178 and a volume 182 external to the housing structure 178. The housing structure 178 may be configured as the inner housing structure 26 (see FIG. 1). The nacelle wall 176, for example, may be configured as or otherwise included as part of the inner barrel 92 of the inner nacelle structure 84 (see FIG. 1), where the housing compartment 180 may be the aft inner housing compartment 98 (see FIG. 1), and where the external volume 182 may be the bypass flowpath 48 (see FIG. 1). Alternatively, the housing structure 178 may be configured as the outer housing structure 28 (see FIG. 1). The nacelle wall 176, for example, may be configured as or otherwise included as part of the nacelle inlet structure 104 and its outer barrel 114 (see FIG. 1), where the housing compartment 180 may be the forward outer housing compartment 126 (see FIG. 1), and where the external volume 182 may be the external environment 136 (see FIG. 1). In another example, the nacelle wall 176 may be configured as or otherwise included as part of the nacelle cowl 106 (see FIG. 1), where the housing compartment 180 may be the intermediate outer housing compartment 128 (see FIG. 1), and where the external volume 182 may be the external environment 136 (see FIG. 1). In still another example, the nacelle wall 176 may be configured as or otherwise included as part of the thrust reverser structure 108 (see FIG. 1), where the housing compartment 180 may be the aft outer housing compartment 132 (see FIG. 1), and where the external volume 182 may be the external environment 136

(see FIG. 1). The present disclosure, however, is not limited to such exemplary arrangements.

The power storage 168 and its power storage elements 172 may be integrated with the nacelle wall 176. The power storage 168 of FIGS. 5A and 5B, for example, includes a power storage housing 184 (e.g., a case) in addition to its power storage elements 172. The power storage elements 172 of FIGS. 5A and 5B are disposed within an interior of the power storage housing 184. The power storage elements 172 are also mounted to the power storage housing 184. The power storage housing 184 may thereby house (e.g., enclose and environmentally isolate) and/or support the power storage elements 172. With the arrangement of FIG. 5A, the power storage housing 184 is mechanically fastened, bonded and/or otherwise attached to the nacelle wall 176 to mount the power storage 168 to the nacelle wall 176. By contrast, with the arrangement of FIG. 5B, the nacelle wall 176 forms a section (e.g., an outer wall) of the power storage housing 184. With both the arrangements of FIGS. 5A and 5B, the power storage 168 and its members 172 and 184 are disposed at a radial inner side of the nacelle wall 176. The power storage 168 and its power storage housing 184 thereby radially border the housing compartment 180. The power storage 168 and its power storage housing 184 are also radially spaced out from an inner wall 186 of the housing structure 178 (e.g., the respective inner or outer case 74, 100 of FIG. 1, or another element of the respective housing structure 26, 28 of FIG. 1) by at least a portion of the housing compartment 180. The housing compartment 180 may thereby provide a thermal buffer between the power storage 168 and an operational hotter region of the aircraft propulsion system 20; e.g., the engine core 44 of FIG. 1. This arrangement may also facilitate at least partial isolation of the power storage 168 and its members 172 and 184 from vibrations and/or flexures of the housing inner wall 186. Moreover, by locating the power storage 168 to the compartment side of the nacelle wall 176, the power storage 168 may be packaged in what may otherwise be unoccupied and available space within the aircraft propulsion system 20.

Referring to FIG. 3, the power storage 168 and its power storage elements 172 may be arranged in thermal communication with a working fluid system 188. This working fluid system 188 is configured to regulate a temperature of the power storage 168 and its power storage elements 172 using a working fluid. The working fluid system 188 of FIG. 3, for example, includes a fluid circuit 190 that extends through the power storage 168. This fluid circuit 190 of FIG. 3 includes one or more heat transfer legs 192, where each heat transfer leg 192 may be disposed between a circumferentially neighboring pair of the power storage elements 172 in each power storage element row 174. The heat transfer legs 192 may be fluidly discrete and arranged in parallel axially across the power storage 168. Alternatively, the heat transfer legs 192 may be interconnected and/or formed by different regions of a common plenum within the power storage housing 184. With the arrangement of FIG. 3, heat energy may transfer between (a) the power storage 168 and its power storage elements 172 and (b) the working fluid flowing through the heat transfer legs 192. More particularly, heat energy generated by operation of the power storage 168 and its power storage elements 172 may be transferred into the working fluid in the heat transfer legs 192 to cool the power storage 168 and its power storage elements 172. However, it is contemplated heat energy may alternatively be transferred into the power storage 168 and its power storage elements 172 from the working fluid in the heat transfer legs 192, for example, to maintain power storage health in cold climates, etc.

The working fluid system 188 may be configured as an air system of the aircraft propulsion system 20, and the working fluid may be pressurized air such as compressed air or ram air. The fluid circuit 190, for example, may extend through the power storage 168 between an air source 194 and an air sink 196. The air source 194 is configured to provide the pressurized air to the working fluid system 188 and its fluid circuit 190. The air source 194, for example, may be configured as the bypass flowpath 48 or the core flowpath 46 (see FIG. 1), where the fluid circuit 190 bleeds the pressurized air from the respective flowpath 46, 48. The air sink 196 is configured to receive the pressurized air from the working fluid system 188 and its fluid circuit 190 following the heat energy transfer with the power storage 168. The air sink 196, for example, may be configured as the bypass flowpath 48 (see FIG. 1), a compartment within the aircraft propulsion system 20 (e.g., the housing compartment 180), or the external environment 136. The present disclosure, however, is not limited to such an exemplary working fluid system. The working fluid system 188, for example, may alternatively be configured as a lubrication system, a thermal management system (TMS), a hydraulic system, or a fuel system for the aircraft propulsion system 20. With such an arrangement, the working fluid may be a liquid such as lubricant (e.g., oil), coolant, hydraulic fluid, or fuel.

Figure 6:
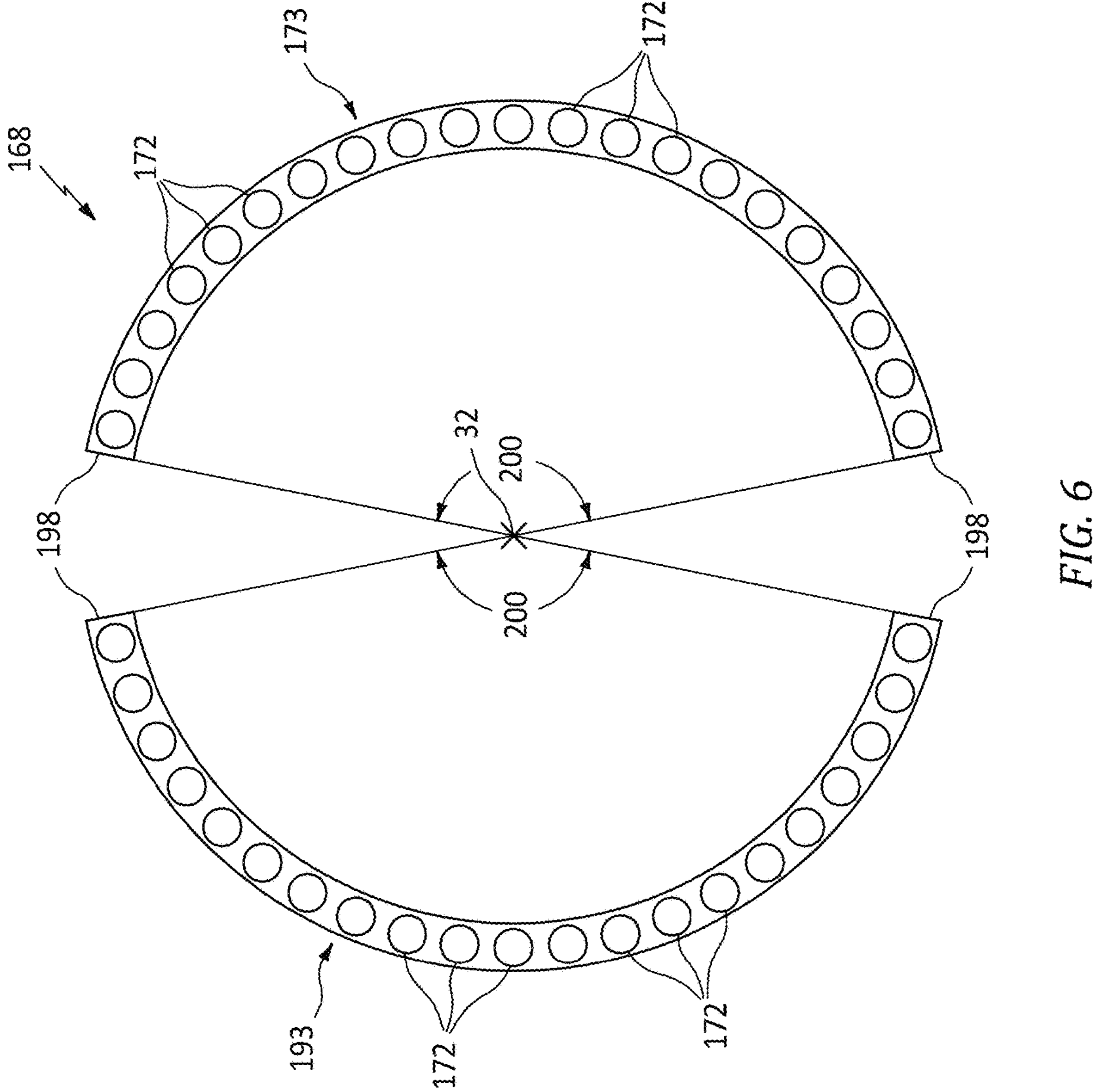
FIG. 6 is an end view illustration of the power storage with multiple power storage element arrays.

The power storage 168 is described above with the single power storage element array 173 for ease of description. However, referring to FIG. 6, the power storage 168 may alternatively be configured with multiple of the power storage element arrays 173; e.g., multiple battery packs. These power storage element arrays 173 may be arranged to opposing sides of the housing structure 178. Each power storage element array 173 extends circumferentially about the propulsion system axis 32 between opposing circumferential sides 198 of the respective power storage element array 173. These array sides 198 are angularly offset by an offset angle 200 about the propulsion system axis 32. The offset angle 200 may be an acute angle, a right angle or an obtuse angle. The offset angle 200, for example, may be equal to or greater than ten degrees (10°), twenty degrees (20°) or thirty degrees (30°). The offset angle 200 may also or alternatively be equal to or less than one-hundred and eighty degrees (180°), one-hundred and seventy degrees (170°) or one-hundred and sixty degrees (160°). With such an arrangement, each power storage element array 173 may circumferentially overlap between five percent (5%) and forty-five percent (45%) of the housing inner wall 186 (see FIGS. 5A and 5B). The power storage element arrays 173 may collectively circumferentially overlap between forty-five percent (45%) and ninety percent (90%) of the housing inner wall 186 (see FIGS. 5A and 5B). The present disclosure, of course, is not limited to such exemplary power storage/power storage element array arrangements. For example, each of the power storage element arrays 173 may be divided into two or more additional arrays; e.g., battery packs. Moreover, while the power storage 168 is described as being arranged with one of the housing structures 26, 28 (see FIG. 1), it is contemplated one or both of these housing structures 26 and/or 28 may each be configured with one or more discrete power storages or arrays of a common power storage.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

an engine case configured to house at least one bladed rotor of an engine core of a turbine engine traversed by a core flowpath, the engine case extending axially along and circumferentially about an axis;

a nacelle wall extending axially along and circumferentially about the engine case, the nacelle wall spaced radially outboard from the engine case with a housing compartment radially between the engine case and the nacelle wall; and a power storage integrated with the nacelle wall, the power storage radially separated from the engine case by the housing compartment, the power storage comprises a power storage housing attached to the nacelle wall and traversed by a fluid circuit fluidly connected to the core flowpath, and one or more batteries within the power storage housing.

2. The assembly of claim 1, wherein the power storage housing is attached to the nacelle wall at an inner side of the nacelle wall.

3. The assembly of claim 1, wherein an outer wall of the power storage housing is formed by the nacelle wall.

4. The assembly of claim 1, further comprising:

the engine core comprising a compressor section, a combustor section and a turbine section;

the compressor section or the turbine section comprising the at least one bladed rotor; and the engine case housing the engine core.

5. The assembly of claim 1, wherein the aircraft propulsion system is a turbofan propulsion system with a bypass flowpath, and the nacelle wall forms a radial inner peripheral boundary of the bypass flowpath.

6. The assembly of claim 1, further comprising an inner fixed structure that includes the nacelle wall.

7. The assembly of claim 1, wherein the power storage circumferentially overlaps between five percent and forty-five percent of the engine case.

8. The assembly of claim 1, wherein the power storage circumferentially overlaps between forty-five percent and ninety percent of the engine case.

9. The assembly of claim 1, further comprising a working fluid system in thermal communication with the power storage, the working fluid system configured to regulate a temperature of the power storage, via the fluid circuit.

10. The assembly of claim 1, further comprising a working fluid system comprising the fluid circuit and the working fluid system configured to direct air through the fluid circuit and transfer heat energy between the air and the power storage.

11. The assembly of claim 1, further comprising a working fluid system comprising the fluid circuit and the working fluid system configured to direct a compressed air through the fluid circuit and transfer heat energy between the compressed air and the power storage.

12. The assembly of claim 1, further comprising:

an electric machine configurable as at least one of an electric motor or an electric generator; and an electric machine controller configured to control operation of the electric machine, the electric machine controller electrically coupled between the electric machine and the power storage.

13. A propulsion system for an aircraft, comprising:

a propulsor section;

an engine core configured to power operation of the propulsor section, the engine core traversed by a core flowpath and including a compressor section, a combustor section and a turbine section;

an inner housing structure configured to house the engine core, the inner housing structure comprising a nacelle wall configured to form an inner peripheral boundary of a flowpath that bypasses the engine core;

an outer housing structure configured to house the propulsor section and spaced radially outboard from the inner housing structure, the outer housing structure further configured to form an outer peripheral boundary of the flowpath that bypasses the engine core; and a battery pack comprising a plurality of batteries, the battery pack attached to the nacelle wall and enclosed by a power storage housing traversed by a fluid circuit fluidly connected to the core flowpath.

* * * * *